Figures 1, 2:
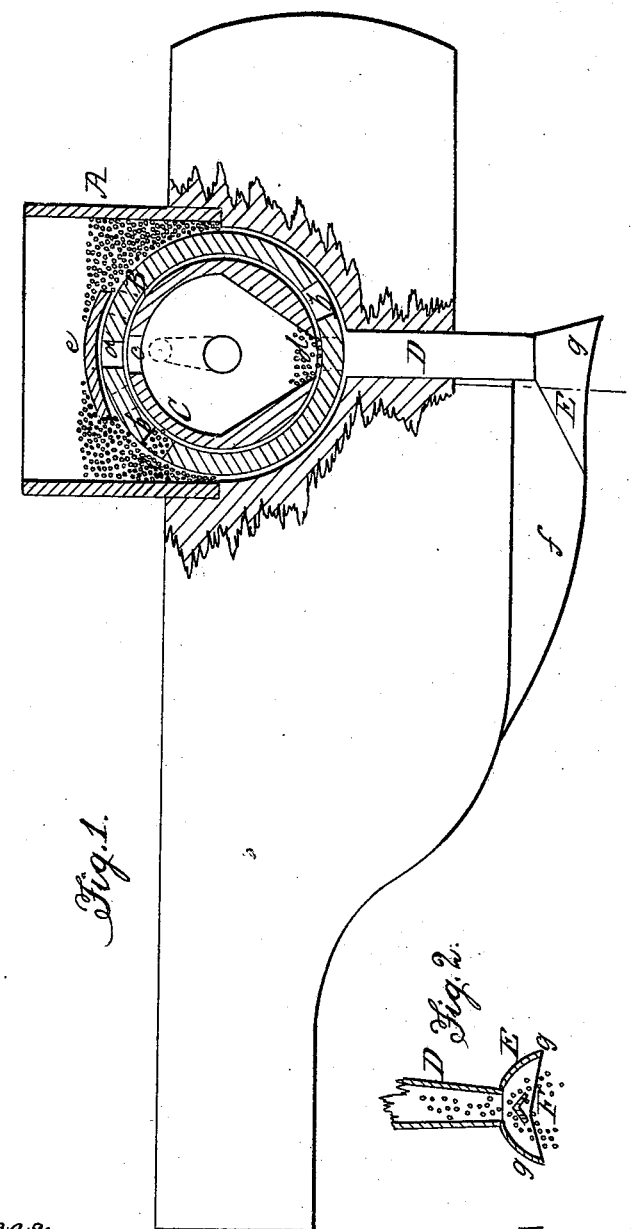

M. MITCHELL
Seed-Dropper.

No. 28,593.

Patented June 5. 1860

Witnesses:
R. S. Spencer
J. W. Coombs

Inventor:
Matthew Mitchell
per Murray
Attorney

UNITED STATES PATENT OFFICE.

MATTHEW MITCHELL, OF ALTONA, ILLINOIS.

IMPROVEMENT IN SEEDING-MACHINES.

Specification forming part of Letters Patent No. 28,593, dated June 5, 1860.

*To all whom it may concern:*

Be it known that I, MATTHEW MITCHELL, of Altona, in the county of Knox and State of Illinois, have invented a new and Improved Seeding-Machine; and I do hereby declare that the following is a full, clear, and exact description of the same, reference being had to the annexed drawings, making a part of this specification, in which—

Figure 1 is a side sectional view of my invention; Fig. 2, a detached sectional view of the tube and cutter or furrow-share and scatterer *x x*. Fig. 1 indicates the plane of section.

Similar letters of reference indicate corresponding parts in the two figures.

This invention relates to an improved seed-distributing device, constructed substantially as hereinafter fully shown and described, whereby the seed, in passing from the seed-box to the furrow, is subjected to two dropping operations and the seed properly distributed in the furrow prepared to receive it.

The invention consists in the employment or use of an oscillating rim or band which encompasses a stationary cylinder provided with two holes or openings, the oscillating rim or band being provided with a single opening, which works underneath a cut-off, the above parts being used in connection with a scatterer and seed-tube, whereby the desired end is attained.

To enable those skilled in the art to fully understand and construct my invention, I will proceed to describe it.

A represents a seed-box, which is placed on any suitable framing, and B represents a rim or band, which is fitted on a hollow cylinder, C. The rim or band B forms the bottom of the seed-box, and it is allowed to move or work freely on the cylinder C. The rim or band B has three holes, *a b b'*, made in it, as shown clearly in Fig. 1. The stationary cylinder C has two holes, *c d*. These holes are in line with each other, one directly over the other, as shown clearly in Fig. 1. Within the seed-box A and directly over the rim or band B there is placed a segment, *e*, which serves as a cut-off. The holes *a b b'* in the rim or band B and the holes *c d* in the stationary cylinder C have such a relative position with each other that when the holes *a c* are in line or register with each other the holes *b d* will be out of line and the hole *b'* out from underneath the cut-off, as shown in black in Fig. 1, and when the hole *a* is out of line with the hole *c* and out from underneath the cut-off, so as to fill with seed, the hole *b'* will be in line with hole *c*, the holes *b d* being also out of line; but when the holes *a b'* arrive at points at the ends of the cut-off *e* the holes *b d* are in line, as shown in red outline, Fig. 1.

In the framing of the machine there is fitted a tube, D, to the bottom of which the cutter and furrow-share E is attached. This cutter or share is formed of a blade, *f*, curved in front, and having two wings or sides, *g g*, expanded behind to form a furrow as they pass through the ground, as will be fully understood by referring to Fig. 2. Within the space formed by the wings or sides *g g* a double-inclined plate, F, is placed, said plate being directly underneath the tube D, as shown in Fig. 2. The tube D is placed directly in line with the center of the cylinder C, as shown in Fig. 1.

The operation is as follows: The seed is placed in the seed-box A, and the rim or band B has an oscillating movement given it by any proper means. The holes *a b'* in the rim B alternately fill with seed as they pass out from underneath the cut-off plate *e*, and the seed, as said holes alternately pass in line with the hole *c*, discharge their contents into the stationary cylinder C, and the seed is discharged from the cylinder C each time the hole *b* passes in line with the hole *d*, the holes *b d* coming in register, as before stated, just as the holes *a b'* reach the ends of the cut-off *e*. The seed, as it is discharged from the cylinder B, passes into the tube D and drops on the plate F, which scatters the seed in the furrow formed by the share E. The scatterer or plate F properly disposes the seed in the furrow, placing the same in a state favorable for the proper growth and cultivation of the plants. The double seed-dropping arrangement prevents the seed being unduly scattered and insures a more even distribution of the seed.

I do not claim, separately, the scatterers E, for they have been previously used; but I do claim as new and desire to secure by Letters Patent—

1. The combination of the perforated oscillating rim or band B, stationary perforated cylinder C, and cut-off e, arranged substantially as described, and relatively with the seed-box A and tube D, to operate as and for the purpose set forth.

2. In combination with the perforated oscillating rim or band B, perforated stationary cylinder C, and cut-off e, the tube D, scatterer F, and share E, all arranged for joint operation as set forth.

MATTHEW MITCHELL.

Witnesses:
   SAML. P. WHITING,
   H. SCOTT.